(12) United States Patent
Deponti et al.

(10) Patent No.: US 12,091,128 B2
(45) Date of Patent: Sep. 17, 2024

(54) LEVER-OPERATED IMPROVED ACTUATION DEVICE FOR BRAKE OR CLUTCH, IN PARTICULAR FOR MOTORCYCLES, AND METHOD OF DISASSEMBLY/ASSEMBLY OF A LEVER-OPERATED ACTUATION DEVICE

(71) Applicant: Freni Brembo S.p.A., Bergamo (IT)

(72) Inventors: Andrea Deponti, Bergamo (IT); Gabriele Verdelli, Bergamo (IT); Pierangelo Gherardi, Bergamo (IT)

(73) Assignee: Brembo S.p.A., Bergamo (IT)

( * ) Notice: Subject to any disclaimer, the term of this patent is extended or adjusted under 35 U.S.C. 154(b) by 715 days.

(21) Appl. No.: 17/292,494

(22) PCT Filed: Oct. 29, 2019

(86) PCT No.: PCT/IB2019/059267
§ 371 (c)(1),
(2) Date: May 10, 2021

(87) PCT Pub. No.: WO2020/099968
PCT Pub. Date: May 22, 2020

(65) Prior Publication Data
US 2022/0017178 A1 Jan. 20, 2022

(30) Foreign Application Priority Data
Nov. 12, 2018 (IT) .......................... 102018000010228

(51) Int. Cl.
*B62L 3/02* (2006.01)
*B62K 23/06* (2006.01)

(52) U.S. Cl.
CPC .............. *B62L 3/023* (2013.01); *B62K 23/06* (2013.01)

(58) Field of Classification Search
CPC ....................................................... B62L 3/023
See application file for complete search history.

(56) References Cited

U.S. PATENT DOCUMENTS

| 2009/0049945 A1 | 2/2009 | Weiher |
| 2016/0194052 A1 | 7/2016 | Barnett |

FOREIGN PATENT DOCUMENTS

| DE | 102017223745 A1 | 8/2018 |
| IT | PD20120323 A1 | 5/2014 |

(Continued)

OTHER PUBLICATIONS

Italian Ministry of Economic Development, Italian Search Report in Application No. IT 201800010228, dated Aug. 1, 2019, 2 pages. The Hauge.

(Continued)

*Primary Examiner* — Melody M Burch
(74) *Attorney, Agent, or Firm* — Marshall & Melhorn, LLC

(57) ABSTRACT

A lever-operated actuation device for a brake or clutch may have a pump body housing a hydraulic pump provided with a float and a hub rotatably associated with the pump body around a lever pin defining a rotation axis, the hub being associated with a tip operatively connected to the float for its actuation. The pump body may have a pair of fixing ears provided with fixing holes for the lever pin, the lever pin rotatably supporting an associable lever assembly. The lever assembly may have a manual actuation lever and a lever guide suitable to actuate the tip via the hub. The actuation device may have a retention device that keep the hub joined to the pump body, following the removal of the lever pin and the lever assembly for its disassembly/replacement.

18 Claims, 4 Drawing Sheets

(56) References Cited

FOREIGN PATENT DOCUMENTS

| JP | H0630821 U | * | 4/1994 | |
|---|---|---|---|---|
| JP | H0633215 U | * | 4/1994 | |
| JP | H08268259 A | | 10/1996 | |
| JP | 2005001440 A | | 1/2005 | |
| JP | 2010509112 A | | 3/2010 | |
| TW | 201437085 A | | 10/2014 | |
| WO | WO-9421510 A1 | * | 9/1994 | ............. B62K 23/02 |
| WO | 2010073276 A1 | | 7/2010 | |
| WO | 2014111544 A2 | | 7/2014 | |
| WO | 2015063645 A1 | | 5/2015 | |
| WO | 2018083578 A1 | | 5/2018 | |

OTHER PUBLICATIONS

European Patent Office, International Search Report and Written Opinion in Application No. PCT/IB2019059267, dated Dec. 12, 2019, 10 pages, Rijswijk, Netherlands.
China National Intellectual Property Administration, Office Action in Application No. CN201980074357.5, dated Apr. 6, 2022, 11 pages.
Japan Patent Office, Office Action in Application No. JP2021525684, dated Sep. 12, 2023, 5 pages.

* cited by examiner

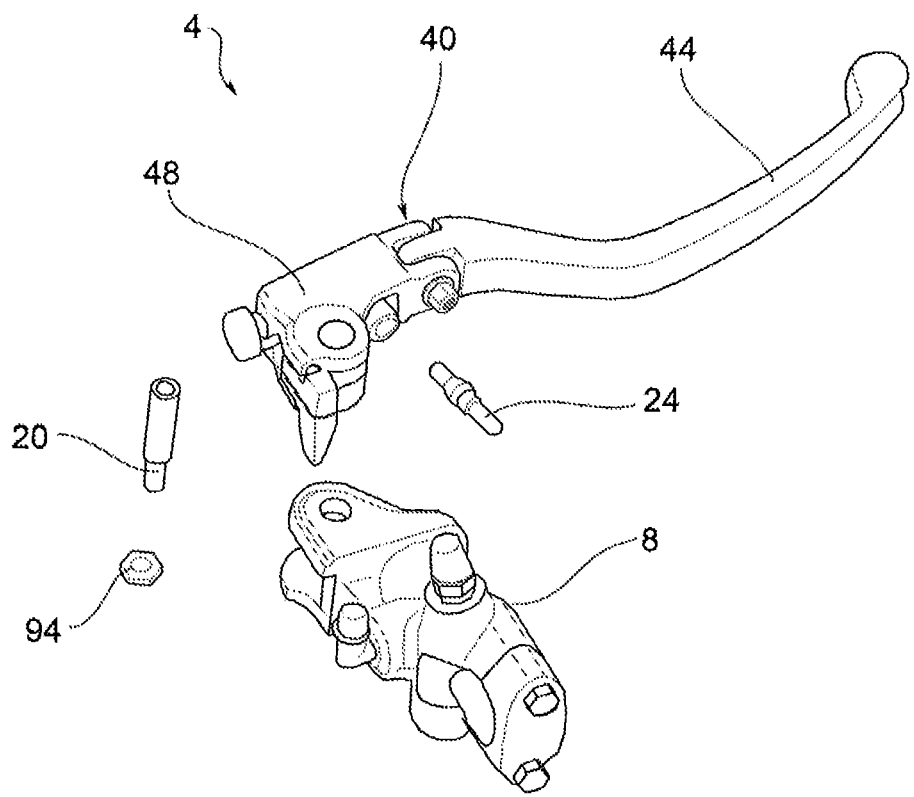
FIG.1 - PRIOR ART
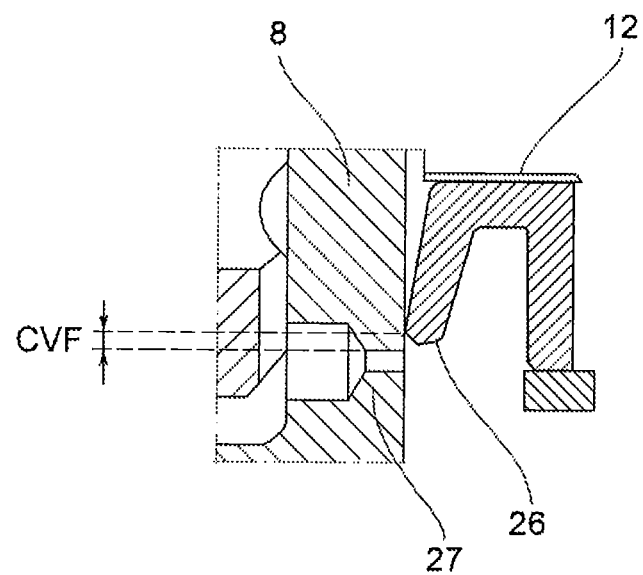
FIG.2

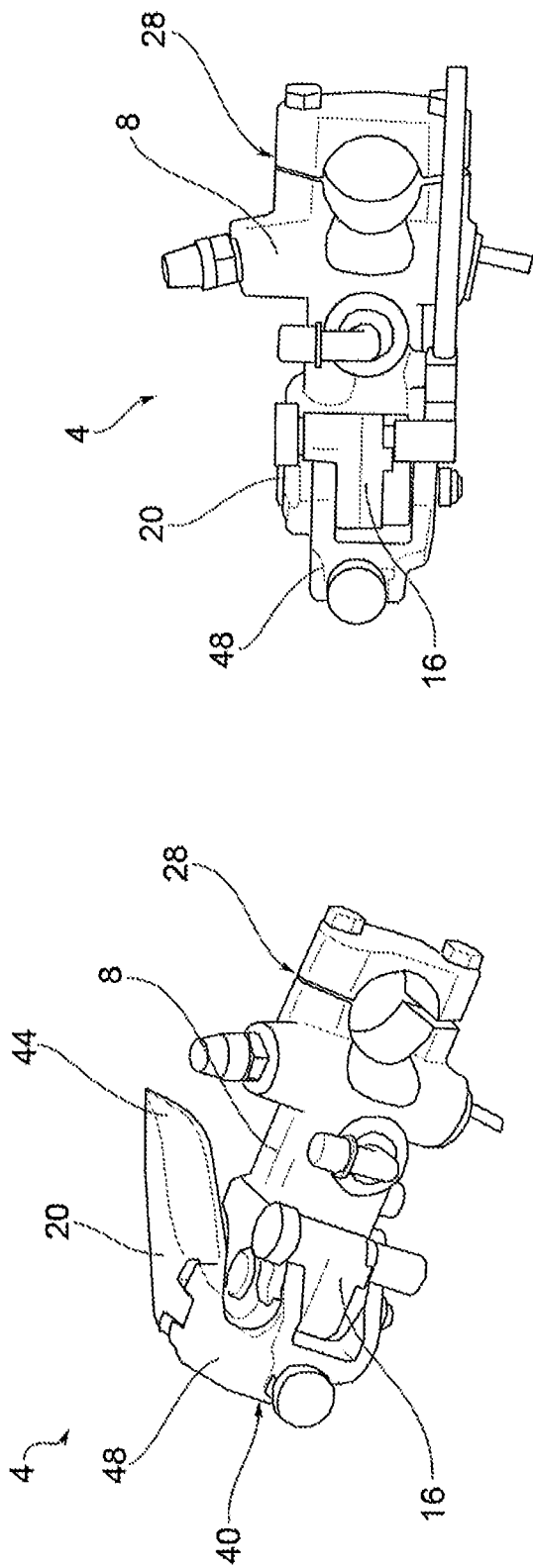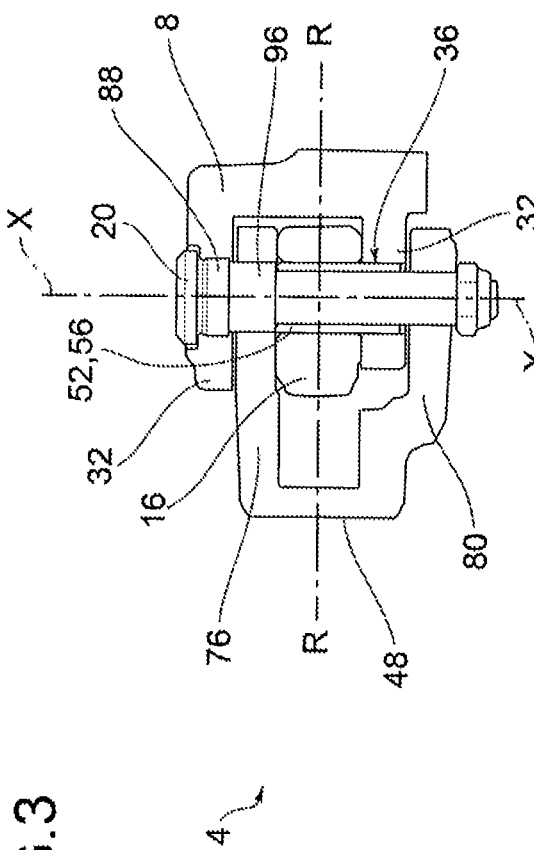

LEVER-OPERATED IMPROVED ACTUATION DEVICE FOR BRAKE OR CLUTCH, IN PARTICULAR FOR MOTORCYCLES, AND METHOD OF DISASSEMBLY/ASSEMBLY OF A LEVER-OPERATED ACTUATION DEVICE

FIELD OF APPLICATION

The present invention relates to a lever-operated improved actuation device for a brake or clutch, in particular for motorcycles, and a method of disassembly/assembly of a lever-operated actuation device.

Background Art

Currently, if a user wants to replace the actuation lever of a lever-operated actuation device, i.e. a pump, brake or clutch, he/she is forced to replace the lever assembly at the corresponding push rod, i.e. the cylindrical element which forms the mechanical connection between the pusher of the actuation lever and the float of the pump designed to pressurize the hydraulic fluid of the pump itself.

For safety reasons, the replacement lever of lever-operated actuation devices is provided together with a push rod characterized in that it has a shorter length with respect to the one of the original installed.

This contrivance is used to avoid the primary gasket arranged on the float from being downstream of the pump supply hole which fluidly connects the fluid tank to the pump itself (FIG. 2), upon the replacement of the lever.

Indeed, under rest condition of the lever, the gasket is always to be upstream of the supply hole so as to ensure the liquid can compensate for the advancement of the piston acting on the pads (in the case of a disc brake) due to the wear of friction material which occurs simultaneously with any braking action.

If instead, under rest condition of the lever, the primary gasket were downstream of the supply hole, this fluid top up would not occur and therefore an involuntary deceleration or even an involuntary blocking of the axis of the vehicle could occur.

Simultaneously, the distance between the primary gasket and the supply hole is to be calibrated and quite reduced because it in fact defines the empty stroke of the lever, whereby it is essential for defining the feeling by the user.

This results in the calibration of the empty stroke (cvf) to be an important and delicate parameter that is always established at the factory.

For this reason, the replacement lever of the known solutions in the current state has a push rod having a slightly shorter length with respect to the original piece installed at the factory: thereby due to the tolerance of the components replaced, it is ensured that the variation of the empty stroke (cvf) is absorbed by the length of the push rod provided as a replacement and that the primary gasket is not downstream of the pump supply hole.

However by doing this, there tends to be an increase of the empty stroke upon the replacement of the lever. If the empty stroke of the pump float increases, the feeling of the lever worsens for the user.

SUMMARY

The need is therefore felt to solve the drawbacks and limitations mentioned in reference to the prior art.

In particular, the need is felt to make available a lever-operated improved actuation device which allows quickly and effectively replacing the actuation lever without modifying the empty stroke in any manner with respect to the factory-set parameter and thus without modifying the lever feeling by the user.

Such a need is met by a lever-operated actuation device according to the claims and by a method of disassembly/assembly of a lever-operated actuation device according to the claims.

In particular, such a need is met by a lever-operated actuation device for a brake or clutch comprising:
- a pump body housing a hydraulic pump provided with a float and a hub rotatably associated with the pump body around a lever pin defining a rotation axis X-X, the hub being associated with a tip operatively connected to the float for its actuation,
- the pump body having a pair of fixing ears provided with fixing holes for the lever pin, the lever pin rotatably supporting an associable lever assembly, comprising a manual actuation lever and a lever guide suitable to actuate the tip via the hub,
- in which the actuation device comprises retention means that keep the hub joined to the pump body, following the removal of the lever pin and the lever assembly for its disassembly/replacement.

According to a possible embodiment, said retention means are joined to the pump body and are mechanically separate from the lever assembly and the lever pin.

According to a possible embodiment, said retention means comprise a bushing fitted coaxially to the lever pin and the hub about said rotation axis X-X, at least partially inserted in one of said fixing holes, so as to constrain the hub to the pump body.

According to a possible embodiment, said bushing is coupled with interference in said fixing hole made on a fixing ear.

According to a possible embodiment, said interference coupling prevents the axial displacement of the bushing relative to the pump body, in an axial direction parallel to said rotation axis X-X.

According to a possible embodiment, said bushing is inserted with clearance in the hub so as to allow the rotation of the hub.

According to a possible embodiment, the bushing has a cantilevered portion between said ears, less than a maximum axial distance between the ears, so as to identify a free volume having a thickness less than an axial thickness of the hub, said thicknesses and distances being measured parallel to the rotation axis X-X.

According to a possible embodiment, the lever guide has a fork configuration having a pair of branches provided with coupling holes aligned with said fixing holes which receive said lever pin, in which one of said branches is inserted between the fixing ears of the pump body, axially offset with respect to the bushing.

According to a possible embodiment, said branch is inserted inside said free volume.

According to a possible embodiment, the lever pin is coupled to the coupling holes of the branches of the lever guide according to a coupling with clearance.

According to a possible embodiment, the bushing has a height less than or equal to the sum of the axial thickness of the fixing ear in which it is inserted and the axial thickness of the hub, said thicknesses being measured parallel to the rotation axis X-X.

According to a possible embodiment, the retention means are arranged inside the hub and at least one fixing ear of the pump body.

According to a possible embodiment, the lever pin is provided with a threaded head which meshes in a nut screw made on a fixing ear of the pump body.

According to a possible embodiment, the lever pin is provided with a safety nut screwed opposite to the head of the lever pin.

According to a possible embodiment, the lever pin is provided with a cylindrical collar that acts as a hinge with clearance for the lever guide and as an abutment against an axial end of the bushing.

According to a possible embodiment, said float has a primary gasket arranged upstream of a fluid supply hole, in a rest or non-operating configuration of the lever assembly.

According to a possible embodiment, the invention also relates to a method of disassembly/assembly of a lever, comprising the steps of:
- providing an actuation device as described,
- removing the lever pin,
- extracting the lever assembly in a radial direction R-R, perpendicular to said rotation axis X-X, keeping the hub constrained to the bushing.

According to a possible embodiment, the disassembly/assembly method comprises the steps of:
- inserting a new lever assembly in said radial direction R-R, keeping the hub constrained to the bushing,
- fixing the new lever assembly by means of the lever pin.

DESCRIPTION OF THE DRAWINGS

Further features and advantages of the present invention will become more comprehensible from the following description of preferred and non-limiting embodiments thereof, in which:

FIG. 1 depicts a perspective view, in exploded configuration, of a lever-operated actuation device of the known art;

FIG. 2 depicts a sectional view of a detail, in assembled configuration, of a lever-operated actuation device according to one embodiment of the present invention, in which the empty stroke (cvf) of the float is noted;

FIGS. 3 to 4 depict perspective views from different angles, in assembled configuration, of a lever-operated actuation device according to the present invention;

FIG. 5 depicts a sectional view of a detail, in assembled configuration, of the lever-operated actuation device in FIGS. 3 to 4, at the pin of the actuation lever;

The elements or parts of elements common to the embodiments described below will be indicated using the same numerals.

DETAILED DESCRIPTION

Figure 6A:
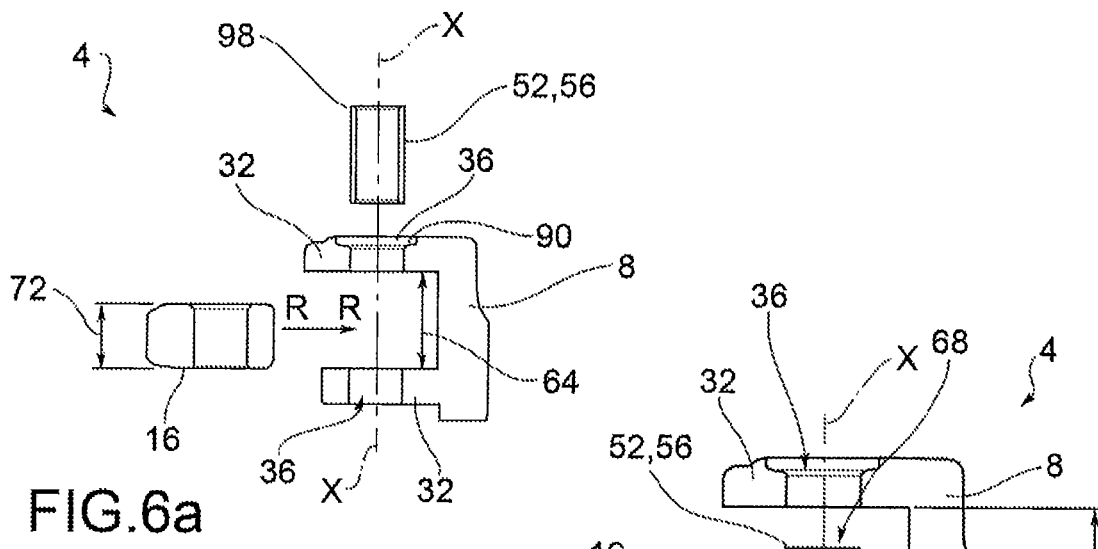
FIGS. 6a to 6d depict sectional views of a series of assembly steps of a lever-operated actuation device according to the present invention.

With reference to the aforesaid drawings, a lever-operated actuation device for a brake or clutch of vehicles, in particular for motorcycles having 2 or more wheels, is indicated as a whole with 4.

The lever-operated actuation device 4 for a brake or clutch comprises a pump body 8 housing a hydraulic pump provided with a float 12 and a hub 16 rotatably associated with the pump body 8 around a lever pin defining a rotation axis X-X.

Hub 16 is associated with a tip 24 operatively connected to float 12 for its actuation.

Float 12 has a primary gasket 26 arranged upstream of a fluid supply hole 27, in a rest or non-operating configuration of the lever-operated actuation device 4.

The pump body 8 also comprises fixing means 28 to an associable support, typically the handlebar of a motorcycle, in a known manner.

The pump body 8 has a pair of fixing ears 32 provided with fixing holes 36 for the lever pin 20.

The lever pin 20 rotatably supports an associable lever assembly 40, comprising a manual actuation lever 44, suitable to be gripped and pulled by a user for the actuation of device 4, and a lever guide 48 suitable to actuate tip 24 via hub 16.

The actuation lever 44 and the lever guide 48 may possibly be in one piece.

Advantageously, the lever-operated actuation device 4 comprises retention means 52 that keep hub 16 joined to the pump body 8, following the removal of the lever pin and the lever assembly 40 for its disassembly/replacement.

Said retention means 52 are joined to the pump body 8 and are mechanically separate from the lever assembly 40 and the lever pin 20. Thereby, the lever assembly 40 may be removed without also needing to remove hub 16, and therefore tip 24, and without needing to recalibrate the rest position of the latter, as better described later.

According to a possible embodiment, said retention means 52 comprise a bushing 56 fitted coaxially to the lever pin 20 and hub 16 about said rotation axis X-X, at least partially inserted in one of said fixing holes 36, so as to constrain hub 16 to the pump body 8.

Bushing 56 preferably is coupled with interference in said fixing hole 36 made on a fixing ear 32.

This interference coupling between bushing 56 and the fixing hole 36 prevents the axial displacement of bushing 56 relative to the pump body 8, in an axial direction parallel to said rotation axis X-X.

Bushing 56 is in turn inserted with clearance in hub 16 so as to allow the rotation of hub 16: such a rotation serves to transmit the rotary movement of the actuation lever 44 and lever guide 48 into translating movement of float 12 via hub 16 and tip 24. Hub 16 indeed is to rotate to favor the rotary movement of the lever assembly 40.

The retention means 52 preferably are arranged inside hub 16 and at least one fixing ear 32 of the pump body 8.

In this regard, according to one embodiment, bushing 56 has a height less than or equal to the sum of the axial thickness of the fixing ear 32 in which it is inserted and the axial thickness of hub 16, said axial thicknesses being measured parallel to the rotation axis X-X.

Bushing 56 preferably has a cantilevered portion 60 between said fixing ears 32, less than a maximum axial distance 64 between the ears 32 themselves, so as to identify a free volume 68 having a thickness less than an axial thickness 72 of hub 16, said thicknesses and distances being measured parallel to the rotation axis X-X.

The contrivance mentioned above ensures that hub 16 may not be accidentally removed from bushing 56, and therefore from the pump body 8, without first at least partially disassembling the bushing itself. Therefore, hub 16 remains in position with the corresponding tip 24, without modifying the factory-calibrated empty stroke (cvf).

According to one embodiment, the lever guide 48 has a fork configuration having a pair of branches 76, 80 provided with coupling holes 84 aligned with said fixing holes 36 which receive said lever pin 20, in which one of said branches 76, 80 is inserted between the fixing ears of the pump body 8, axially offset with respect to bushing 56.

Said branch preferably is inserted inside said free volume 68.

The lever pin 20 is coupled to the coupling holes 84 of the branches 76, 80 of the lever guide 48 according to a coupling with clearance: thereby, the lever assembly 40 is free to rotate around the rotation axis X-X under the manual thrust of the user.

The lever pin 20 may have various configurations.

For example, the lever pin 20 is provided with a threaded head 88 which meshes in a nut screw 90 made on a fixing ear 32 of the pump body 8.

The lever pin 20 preferably is provided with a safety nut 94 screwed opposite to the threaded head 88 of the lever pin 20.

According to one embodiment, the lever pin 20 is provided with a cylindrical collar 96 that acts as a hinge with clearance for the lever guide 48 and as an abutment against an axial end 98 of bushing 56.

The assembly and disassembly method of a lever-operated actuation device according to the present invention is now described.

In particular, the safety nut 94 and the lever pin 20 are unscrewed, removing the latter from the pump body 8, in order to disassemble and replace the lever assembly 40; at this point, the lever assembly 40 is released and free to be separated from the rest of the pump body 8.

Hub 16 remains in its original position during these simple operations due to bushing 56 constrained to the pump body 8, in particular to a fixing hole 36 of the pump body 8: therefore, the factory-calibrated empty stroke (cvf) is not modified.

Figure 6B:
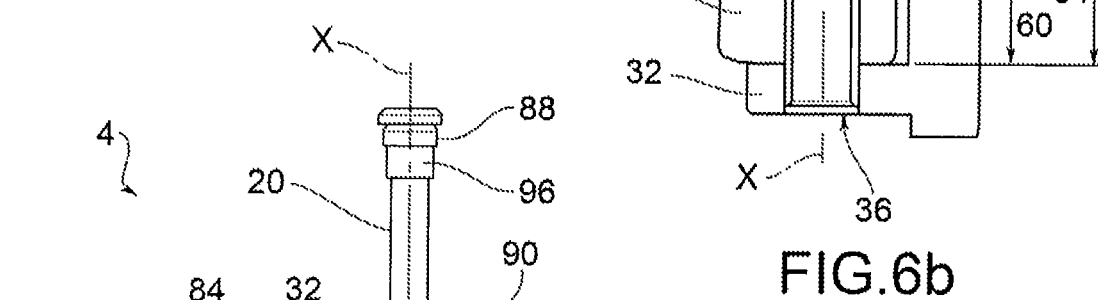
Figure 6C:
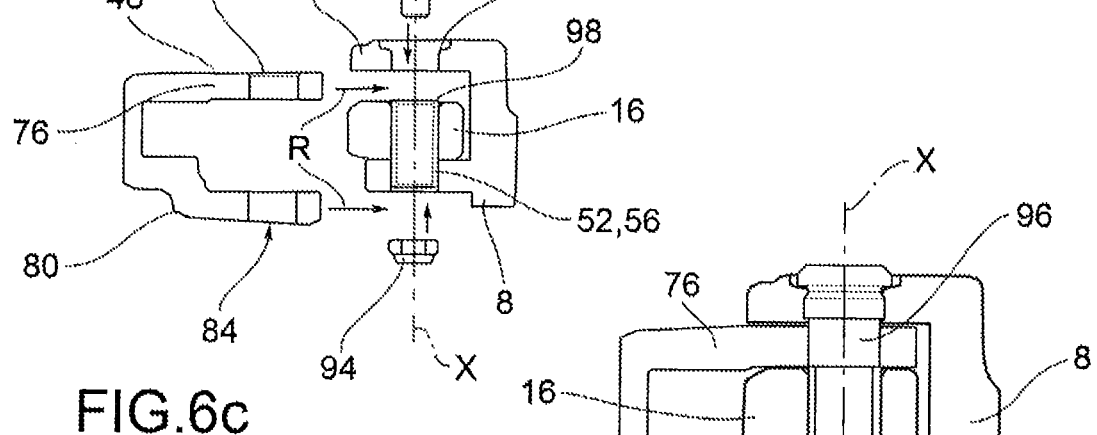
Figure 6D:
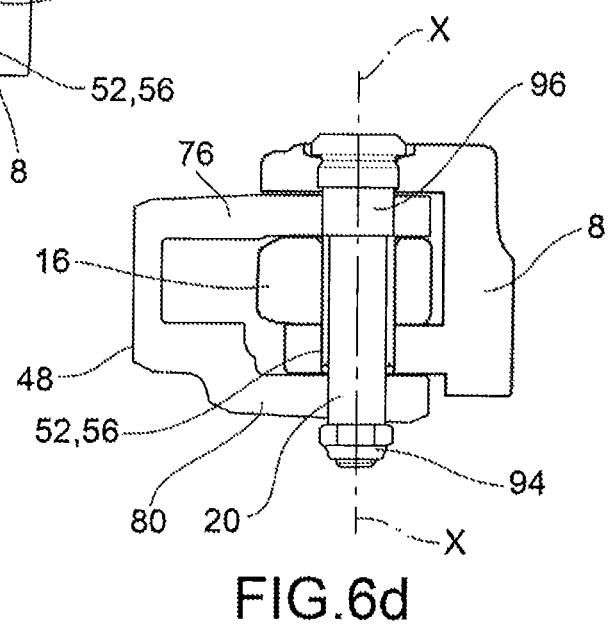
Figure 7:
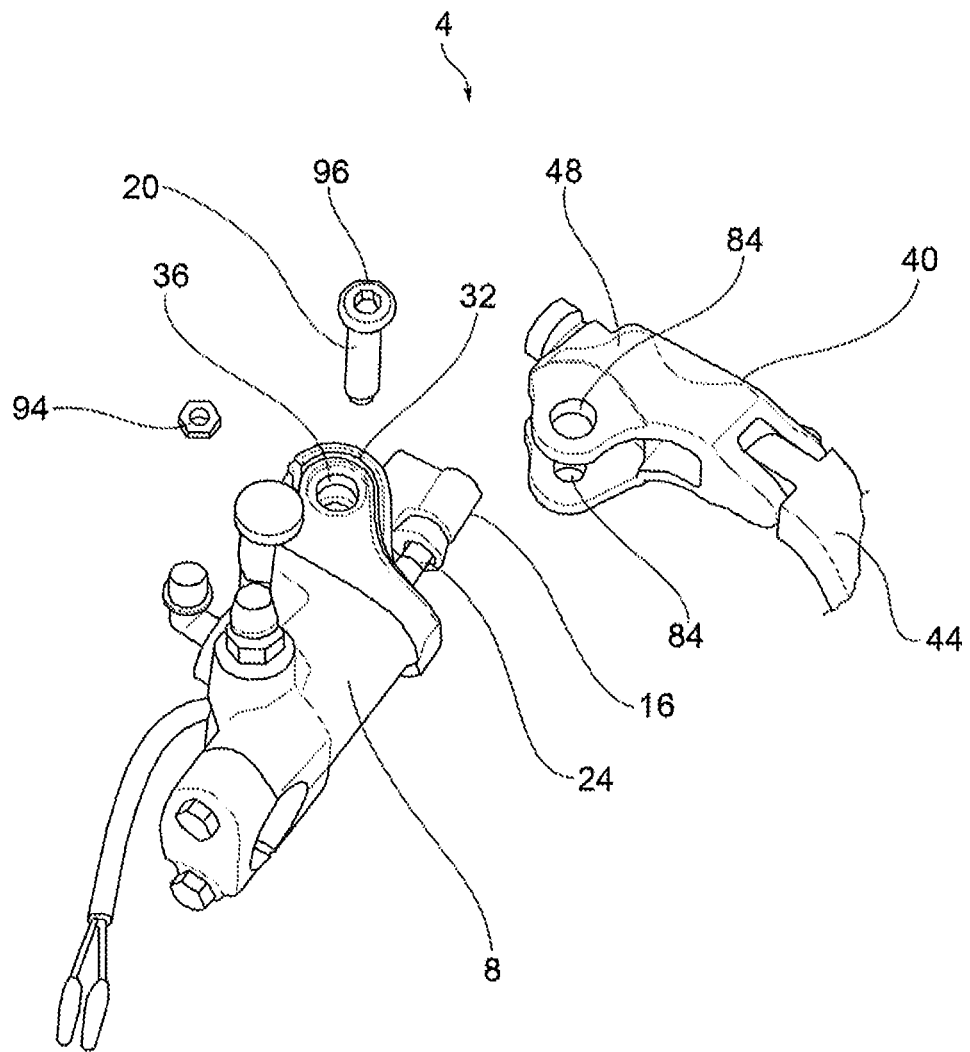
FIG. 7 depicts a perspective view of a disassembly step of a lever-operated actuation device according to the present invention.

Obviously, the reassembly steps are inverted, as shown in FIGS. 6*a* to 6*d*.

Hub 16 always remains constrained to the pump body 8 in both assembly and disassembly steps due to the snap fixing of bushing 56 on the pump body.

As may be appreciated by what is described, the lever-operated actuation device according to the invention allows the drawbacks introduced in the known art to be overcome.

Due to the present invention, the calibration of the empty stroke in particular carried out at the factory is not modified during the lever replacement operations: the advantage therefore is of the performance and safety type.

Indeed, the present invention achieves the goal of making the lever assembly independent of the calibration of the empty stroke during the replacement of the lever, with the object of keeping unvaried the factory-set parameters.

Thus, there is the possibility of replacing the lever without modifying the empty stroke of the pump.

All this is obtained due to the fact of releasing the components participating in determining the empty stroke from the lever assembly.

In particular, it therefore is sufficient that during all the lever replacement operations, the hub remains constrained to the pump assembly and released from the rest of the lever assembly, which may be easily disassembled and replaced without modifying the factory-set calibration of the empty stroke (cvf) of the pump in any manner.

Therefore the lever replacement operations are simplified with respect to the current known embodiment.

The upper part of the pump assembly (the one most visible) remains all but unvaried to the eyes of the user.

Through the solution of the present invention, the number of components related to the replacement lever is less than the known solutions, and therefore so is the cost.

Those skilled in the art, with the object of meeting contingent and specific needs, can make several changes and variants to the lever-operated actuation device described above, moreover all contained within the scope of the invention, which is defined by the following claims.

The invention claimed is:

1. A lever-operated actuation device for brake or clutch comprising:
   a pump body housing a hydraulic pump provided with a float and a hub rotatably associated with the pump body around a lever pin defining a rotation axis, the hub being associated with a tip operatively connected to the float for its actuation,
   the pump body having a pair of fixing ears provided with fixing holes for the lever pin, the lever pin rotatably supporting an associable lever assembly, comprising a manual actuation lever and a lever guide suitable to actuate the tip via the hub,
   wherein the actuation device comprises retention means that keep the hub joined to the pump body, following the removal of the lever pin and the lever assembly for its disassembly/replacement.

2. The lever-operated actuation device for brake or clutch according to claim 1, wherein said retention means are joined to the pump body and are mechanically separate from the lever assembly and the lever pin.

3. The lever-operated actuation device for brake or clutch according to claim 1, wherein said retention means comprise a bushing fitted coaxially to the lever pin and the hub about said rotation axis, at least partially inserted in one of said fixing holes, so as to constrain the hub to the pump body.

4. The lever-operated actuation device for brake or clutch according to claim 3, wherein said bushing is coupled with interference in one of said fixing holes made on a fixing ear.

5. The lever-operated actuation device for brake or clutch according to claim 4, wherein said interference coupling is configured to prevent the axial displacement of the bushing relative to the pump body, in an axial direction parallel to said rotation axis.

6. The lever-operated actuation device for brake or clutch according to claim 3, wherein said bushing is inserted with clearance in the hub so as to allow the rotation of the hub.

7. The lever-operated actuation device for brake or clutch according to claim 3, wherein the bushing has a cantilevered portion between said fixing ears, less than a maximum axial distance between the fixing ears, so as to identify a free volume having a thickness less than an axial thickness of the hub, said thicknesses and distances being measured parallel to the rotation axis.

8. The lever-operated actuation device for brake or clutch according to claim 7, wherein the lever guide has a fork configuration having a pair of branches provided with coupling holes aligned with said fixing holes which receive said lever pin, wherein one of said branches is inserted between the fixing ears of the pump body, axially offset with respect to the bushing.

9. The lever-operated actuation device for brake or clutch according to claim 8, wherein one of said branches is inserted inside said free volume.

10. The lever-operated actuation device for brake or clutch according to claim 8, wherein the lever pin is coupled to the coupling holes of the branches of the lever guide according to a coupling with clearance.

11. The lever-operated actuation device for brake or clutch according to claim 3, wherein the bushing has a height less than or equal to the sum of the axial thickness of one of said fixing ears in which it is inserted and the axial thickness of the hub, said thicknesses being measured parallel to the rotation axis.

12. The lever-operated actuation device for brake or clutch according to claim 1, wherein the retention means are arranged inside the hub and one of said fixing ears of the pump body.

13. The lever-operated actuation device for brake or clutch according to claim 1, wherein the lever pin is provided with a threaded head which meshes in a nut screw made on one of said fixing ears of the pump body.

14. The lever-operated actuation device for brake or clutch according to claim 13, wherein the lever pin is provided with a safety nut screwed opposite to the threaded head of the lever pin.

15. The lever-operated actuation device for brake or clutch according to claim 1, wherein the lever pin is provided with a cylindrical collar that acts as a hinge with clearance for the lever guide and as an abutment against an axial end of the bushing.

16. The lever-operated actuation device for brake or clutch according to claim 1, wherein said float has a primary gasket arranged upstream of a fluid supply hole, in a rest or non-operating configuration of the lever assembly.

17. A method of disassembly/assembly of a lever for brake or clutch, comprising the steps of:
providing a lever-operated actuation device according to claim 1,
removing the lever pin,
extracting the lever assembly in a radial direction, perpendicular to said rotation axis, keeping the hub constrained to a bushing fitting in the lever pin.

18. The method of disassembly/assembly of a lever according to claim 17, comprising the steps of:
inserting a new lever assembly in said radial direction, keeping the hub constrained to the bushing,
fixing the new lever assembly by means of the lever pin.

* * * * *